US009373330B2

(12) United States Patent
Cumani et al.

(10) Patent No.: US 9,373,330 B2
(45) Date of Patent: Jun. 21, 2016

(54) FAST SPEAKER RECOGNITION SCORING USING I-VECTOR POSTERIORS AND PROBABILISTIC LINEAR DISCRIMINANT ANALYSIS

(71) Applicant: Nuance Communications, Inc., Burlington, MA (US)

(72) Inventors: Sandro Cumani, Turin (IT); Claudio Vair, Borgone Susa (IT); Daniele Ernesto Colibro, Alessandria (IT); Pietro Laface, Turin (IT); Kevin R. Farrell, Medford, MA (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 14/454,169

(22) Filed: Aug. 7, 2014

(65) Prior Publication Data
US 2016/0042739 A1 Feb. 11, 2016

(51) Int. Cl.
*G10L 15/00* (2013.01)
*G10L 15/065* (2013.01)
*G10L 17/06* (2013.01)

(52) U.S. Cl.
CPC ..................... *G10L 17/06* (2013.01)

(58) Field of Classification Search
CPC ......... G10L 25/78; G10L 15/20; G10L 17/00; G10L 21/0208; G10L 15/28; G10L 15/00; G10L 15/24; G10L 15/26; G10L 25/84; G10L 25/90; G10L 15/18; G10L 15/183; G10L 15/22; G10L 15/265; G10L 15/32; G10L 15/02
USPC .......... 704/233, 246, 270, 231, 275, E11.003, 704/E15.001, E15.039, E15.045, E17.001, 704/E15.019, E15.041, E17.003
See application file for complete search history.

(56) References Cited

U.S. PATENT DOCUMENTS

| 5,623,609 A * | 4/1997 | Kaye ....................... G10L 15/04 704/1 |
| 2007/0049363 A1* | 3/2007 | Green .................. G05B 19/042 455/575.2 |

(Continued)

OTHER PUBLICATIONS

"Probabilistic Linear Discriminant Analysis of I-Vector Posterior Distributions", by Sandro Cumani, et al., pp. 7644-7648; *ICASSP* 2013.
"Text-dependent Speaker Recognition Using PLDA with Uncertainty Propagation", by T. Stafylakis, et al., pp. 3684-3688; *Interspeech*, Aug. 25-29, 2013 Lyon, France.

(Continued)

*Primary Examiner* — Marivelisse Santiago Cordero
*Assistant Examiner* — Stephen Brinich
(74) *Attorney, Agent, or Firm* — Hamilton, Brook, Smith & Reynolds, P.C.

(57) ABSTRACT

A method for performing speaker recognition comprises: estimating respective uncertainties of acoustic coverage of respective speech utterance(s) by first and second speakers, the acoustic coverage representing respective sounds used by the speakers when speaking; representing the respective uncertainties of acoustic coverage in a manner that allows for efficient memory usage by discarding dependencies between uncertainties of different sounds for the speakers; representing the respective uncertainties of acoustic coverage in a manner that allows for efficient computation by representing an inverse of the respective uncertainties of acoustic coverage and then discarding the dependencies between the uncertainties of different sounds for the speakers; and computing a score between the speech utterance(s) by the speakers in a manner that leverages the respective uncertainties of the acoustic coverage during the comparison, the score being indicative of a likelihood that the speakers are the same speaker.

20 Claims, 4 Drawing Sheets

(56) References Cited

U.S. PATENT DOCUMENTS

2009/0037179 A1* 2/2009 Liu .................. G10L 13/033
                                                        704/260
2009/0287489 A1* 11/2009 Savant ................ G10L 15/07
                                                        704/246

OTHER PUBLICATIONS

"Bayesian Speaker Verificatikon with Heavy-Tailed Priors", by Patrick Kenny, *Centre de recherche informatique de Montreal (CRIM)*; Aug. 11, 2010.

* cited by examiner

FAST SPEAKER RECOGNITION SCORING USING I-VECTOR POSTERIORS AND PROBABILISTIC LINEAR DISCRIMINANT ANALYSIS

BACKGROUND

Speaker recognition is employed, or considered for deployment, as a system security tool in many applications and systems. Speaker recognition can include both speaker identification and verification. Speaker identification is determining an identity of an audio sample based on an enrolled population of speakers. Speaker verification uses a voice sample in the form of speech to validate a claimed speaker's identity. In particular, users of a given system or application are verified based on their corresponding voices.

SUMMARY

An embodiment of the present invention includes a method of, and apparatus for, performing speaker recognition. The method comprises estimating respective uncertainties of acoustic coverage of at least one speech utterance by a first speaker and at least one speech utterance by a second speaker, the acoustic coverage representing respective sounds used by the first speaker and by the second speaker when speaking. The method also comprises representing the respective uncertainties of acoustic coverage in a manner that allows for efficient memory usage by discarding dependencies between uncertainties of different sounds for the first speaker and for the second speaker. The method further comprises representing the respective uncertainties of acoustic coverage in a manner that allows for efficient computation by representing an inverse of the respective uncertainties of acoustic coverage and then discarding the dependencies between the uncertainties of different sounds for the first speaker and for the second speaker. The method still further comprises computing a score between the at least one speech utterance by the first speaker and the at least one speech utterance by the second speaker in a manner that leverages the respective uncertainties of the acoustic coverage during the comparison, the score being indicative of a likelihood that the first speaker and the second speaker are the same speaker.

Representing the respective uncertainties of acoustic coverage in a manner that allows for efficient computation may include (i) accumulating an inverse of independent uncertainties of acoustic coverage for multiple speech utterances by the first speaker and for multiple speech utterances by the second speaker; (ii) transforming accumulated inverses of the independent uncertainties of acoustic coverage; and (iii) discarding dependencies between the uncertainties of different sounds represented in the transformed accumulated inverses to produce respective diagonalized, transformed accumulated inverses. Computing the score may include using the respective diagonalized, transformed accumulated inverses.

Within the context of the foregoing embodiments, a method of speaker recognition can include receiving, by a computer system, a set of signals corresponding to a set of speech utterances. The method can further include computing, for each speech utterance of the set of speech utterances, a corresponding identity vector (i-vector), a diagonalized approximation of a covariance matrix of the corresponding i-vector, and a diagonalized approximation of an equivalent precision matrix associated with the corresponding i-vector. Such a computation can be represented, for example, by Equations 31 and 34, described below. The method can further include computing a score based on the i-vectors, the diagonalized approximations of covariance matrices, and the diagonalized approximations of equivalent precision matrices computed, the score being indicative of a likelihood that two sets of utterances belong to the same speaker. The score can be computed for each speaker of a number of speakers known to the computer system, in the case of speaker identification, or for a particular speaker, in the case of speaker verification, where the speakers are known to the computer system by way of parameters that had been previously stored in an associated database. Such a computation can be represented, for example, by Equation 39, described below. The method can also include determining the identifier corresponding to the speaker having the highest score.

In another embodiment, computing the i-vector for a speech utterance of the set of speech utterances includes extracting acoustic features from the signal corresponding to the speech utterance and computing the i-vector based on the acoustic features extracted.

In another embodiment, the method includes computing a set of vectors representing projected first order statistics corresponding to the set of speech utterances based on the i-vectors and the diagonalized approximations of the equivalent precision matrices computed. Such a computation can be represented by Equation 35, described below. The method can further include computing a diagonalized approximation of a cumulative equivalent precision matrix for the set of speech utterances based on the diagonalized approximations of precision matrices computed for each i-vector. Such a computation can be represented by Equation 36, described below. The method can further include diagonalizing a transformation of the diagonalized approximation of the cumulative equivalent precision matrix computed. Such a diagonalization can be represented by Equation 37, described below. Computing the score can be based on the set of projected first order statistics, the diagonalized approximation of the cumulative equivalent precision matrix, and the diagonalized transformation of the diagonalized approximation of the cumulative equivalent precision matrix.

The method can further include maintaining, by the computer system, a set of i-vectors for each speaker known to the computer system. The method can additionally include computing, for each i-vector of a set of i-vectors corresponding to a speaker known to the computer system, a diagonalized approximation of a covariance matrix of the i-vector corresponding to the speaker known to the computer system and a diagonalized approximation of an equivalent precision matrix associated with the i-vector corresponding to the speaker known to the computer system. The method can additionally include computing a set of projected first order statistics, for each speaker known to the computer system, based on the set of i-vectors associated with the speaker known to the computer system and the diagonalized approximations of the equivalent precision matrices computed. Such a computation can be represented by Equation 35, described below, for example. The method can further include computing a diagonalized approximation of a cumulative equivalent precision matrix for each speaker known to the computer system based on the diagonalized approximations of precision matrices computed for each i-vector in the set of i-vectors corresponding to the speaker known to the computer system. Such a computation can be represented by Equation 36, described below, for example. The method can further include diagonalizing a transformation of the diagonalized approximation of the cumulative equivalent precision matrix computed for each speaker known to computer system. Such a diagonalization can be represented by Equation 37, described below, for example. Computing the score can include computing the score based on the set of projected first order statistics, the diagonalized approximation of the cumulative equivalent precision matrix, and the diagonalized transformation of the diagonalized approximation of the cumulative equivalent precision matrix associated with the speaker known to the computer system. The method can further include storing the diagonalized approximation of a covariance matrix of the i-vector in the database.

In another embodiment, determining if the set of speech utterances corresponds to one or any of the number of speakers known to the computer system includes comparing the score computed to a threshold.

In another embodiment, the computer system includes one or more processors and or one or more computer devices.

An apparatus can include a processor, and a memory, with computer code instructions stored thereon. The processor and the memory, with the computer code instructions stored thereon, are configured to cause the apparatus to receive a set of signals corresponding to a set of speech utterances. The processor and the memory are further configured to compute, for each speech utterance of the set of speech utterances, a corresponding identity vector (i-vector), a diagonalized approximation of its covariance matrix, and a diagonalized approximation of an equivalent precision matrix associated with the corresponding i-vector. Such a computation can be represented, for example, by Equations 31 and 34, described below. The processor and the memory are further configured to compute a score based on the i-vectors, the diagonalized approximations of their covariance matrices, and the diagonalized approximations of equivalent precision matrices computed, the score being indicative of a likelihood that two sets of utterances, represented by the corresponding i-vectors and diagonalized covariances, belong to the same speaker. Computing the score can be done for each speaker of a number of speakers known to the computer system, in the case of speaker identification, or for a particular speaker, in the case of speaker verification. Such a computation can be represented, for example, by Equation 39, described below. The processor and the memory are further configured to determine if the set of speech utterances corresponds to any of the number of speakers known to the computer system based on the scores computed.

In an embodiment, a computer-readable medium has computer code stored thereon, and the computer code, when executed by a processor, is configured to cause an apparatus to operate in accordance with the foregoing embodiments.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
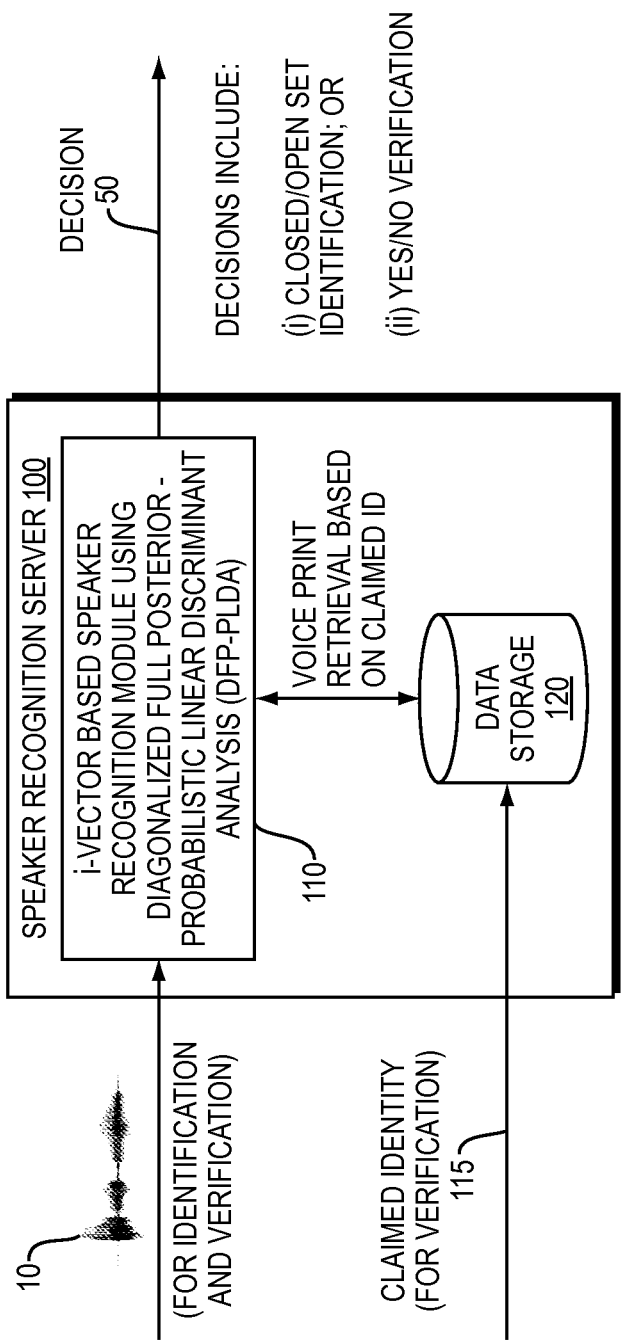
FIG. 1 is a block diagram of a speaker-verification server employing voice biometrics in user authentication according to at least one example embodiment.

FIG. 1 is a block diagram of a speaker-recognition server 100 employing voice biometrics in user authentication according to at least one example embodiment. At least one speech signal 10 is provided by a user to the speaker recognition server 100. The at least one speech signal 10, a sample of the user's voice, may be one or more utterances spoken by the user. When performing speaker verification, the speaker recognition server 100 is configured to validate a claimed identity 115 of the user based on the received speech signal(s) 10 and model parameters for that speaker, including one or more i-vectors and their corresponding diagonalized covariances, extracted from the user's utterances of the speaker recognition server 100, collected, for example, during an enrollment phase and stored in a database, or data storage device, 120. In particular, the speaker recognition server 100 is configured to compare voice characteristics extracted from the speech signal(s) 10, provided by the user to be authenticated, against voice characteristics corresponding to the claimed identity (ID) 115 of that user as retrieved from the database or, for that matter, of all users known to the speaker recognition server 100, if the claimed ID 115 is not known and the system must perform speaker identification. FIG. 1 shows the block diagram of a speaker verification system when the claimed ID 115 is provided; however, the speaker recognition server 100 can be configured also to identify a speaker from received speech signal(s) based on a comparison to a plurality of speakers known to the system when the claimed ID is not provided.

According to at least one example embodiment, the speaker recognition server 100 includes an i-vector based speaker recognition module 110, configured to perform i-vector based speaker recognition. I-vector modeling has become the standard approach for speaker recognition due to its high accuracy and small speaker model footprint. The speaker recognition server 100 outputs a decision 50 with regard to the user verification or identification. For user (i.e., speaker) verification, the decision 50 is indicative of whether the voice characteristics extracted from speech signal 10 sufficiently match (e.g., match above a particular threshold) the voice characteristics represented by the speaker model (voiceprint) stored in 120 for the claimed ID.

According to at least one aspect, the decision 50 is provided to one or more modules to act upon it. For example, the verification decision 50 may be provided to an intelligent voice recognition module, which is configured to allow user access to a requested service or request more information or data from the user based on the speaker verification decision 50. The speaker verification decision may be used by a speech recognition system to determine user-specific speech recognition parameters to be employed.

In addition to speaker verification as described above, the decision can represent the identify of a speaker within an enrolled population of speakers in the case of speaker identification. For user identification, the decision 50 is indicative of which speaker known to the system best matches the input speech signal(s). This is known as closed-set speaker identification. In the event that none of the speakers known to the system have a sufficient match to the input speech signal(s), the system may output a value indicating this, i.e., "none-of-the-above". In the context of identification, the inclusion of the output indicating an insufficient match to any speaker known to the system is known as open-set speaker identification. As with speaker verification, the decision 50 may be provided to one or more modules to act upon it. For example, a public security system may use the decision to notify an agent that the input speech signal(s) appear to match a specific criminal within a database of known perpetrators.

Some existing speaker recognition systems employ a probabilistic linear discriminant analysis (PLDA) model, which exploits intrinsic i-vector uncertainty, and is known to provide good accuracy for short speaker segments. In particular, an approach, referred to as full posterior PLDA (FP-PLDA), is employed in performing i-vector based speaker recognition. However, the FP-PLDA is computationally much more expensive than the standard i-vector based PLDA approach. According to at least one example embodiment, a diagonalized full posterior PLDA (DFP-PLDA) method is employed by the speaker recognition server 100 and, specifically, by the procedure included in the i-Vector Based Speaker Recognition Module 110 and the additional parameters stored in the Data Storage 120. According to at least one aspect, the DFP-PLDA method substantially reduces the computational costs of the FP-PLDA approach while providing similar, or almost similar, accuracy as the FP-PLDA approach.

Figure 2:
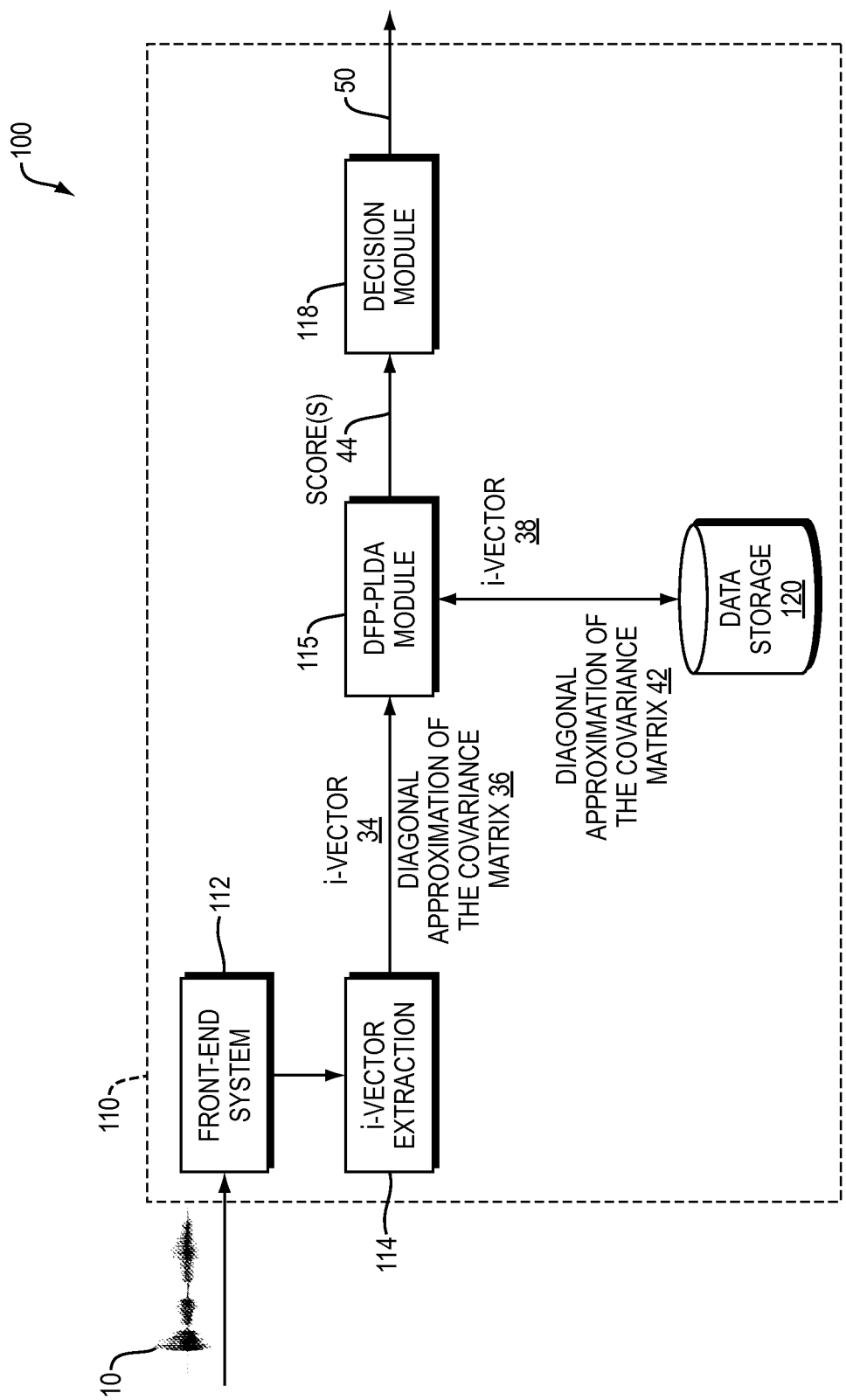
FIG. 2 is a block diagram illustrating functional components of the speaker recognition server, according to at least one example embodiment.

FIG. 2 is a block diagram illustrating functional components of the speaker recognition server 100, according to at least one example embodiment. In particular, the i-vector based speaker verification module 110 includes a front-end system 112, an i-vector extraction module 114, a DFP-PLDA module 115, and a decision module 118. The front-end system 112 is configured to extract feature coefficients from a received speech signal 10. Examples of voice features include Mel frequency cepstral coefficients (MFCCs), linear prediction cepstral coefficients (LPCC), perceptual linear predictive (PLP) cepstral coefficients, or the like. The i-vector extraction module 114 is configured to forward an extracted i-vector 34 and a diagonal approximation of the covariance matrix 36 to the DFP-PLDA module 115. The DFP-PLDA Module 115 can then store the i-vector 38 and diagonal approximation of the covariance matrix 42 in data storage 120. In performing speaker identification, the DFP-PLDA Module 115 produces multiple scores 44. In performing speaker verification, the DFP-PLDA Module 115 produces a single score 44.

Figure 3:
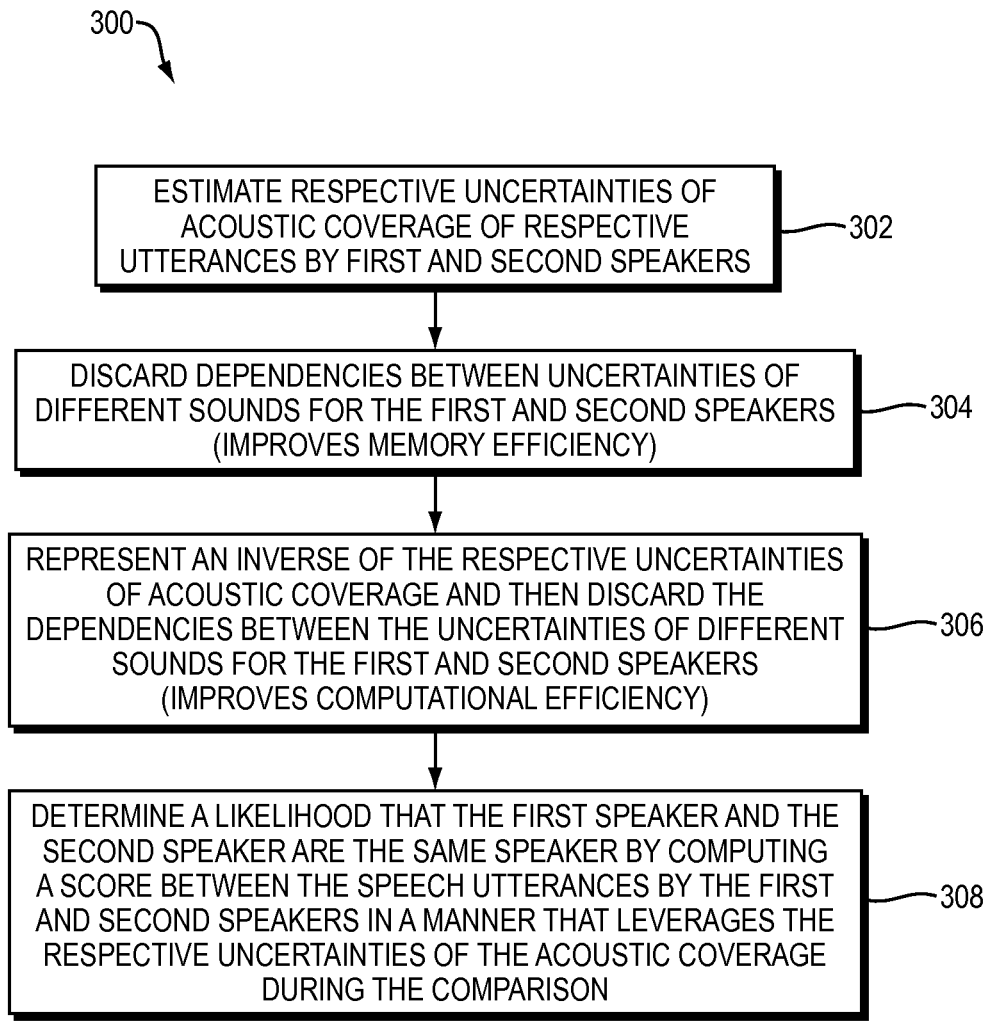
FIG. 3 is a flow diagram that illustrates an example embodiment of the present invention.

FIG. 3 is a flow diagram that illustrates an embodiment of the present invention. The flow diagram includes a method of, and corresponding apparatus for, performing speaker recognition. The method comprises estimating respective uncertainties of acoustic coverage of at least one speech utterance by a first speaker and at least one speech utterance by a second speaker, the acoustic coverage representing respective sounds used by the first speaker and by the second speaker when speaking (302). By estimating the respective uncertainties, a full covariance is obtained, and this captures uncertainty in i-vector modeling due to insufficient acoustic coverage from short utterances. Covariance provides for an uncertainty measurement that may be used to know where, in a phonetic space, there are areas of high, little, or no coverage. For example, in an enrollment speech database, a speaker or many speakers have uttered speech of "1, 2, 3, 4," and an incoming speech signal represents a speaker's uttered speech of "5, 6, 7, 8." In this example, one should understand that there are areas in the phonetic space that have little or no coverage, making identification and verification more uncertain than if the speaker(s) had uttered the same phonemes as in the enrollment speech "5, 6, 7, 8." Thus, use of covariance can be useful, but it comes at a cost of higher memory usage and higher computations. Discarding dependencies between uncertainties of different sounds in a computationally appropriate way can be useful in addressing both costs while simultaneously increasing accuracy, compared to non-covariance techniques, during identification and verification processes.

Continuing to refer to FIG. 3, the method also comprises representing the respective uncertainties of acoustic coverage in a manner that allows for efficient memory usage by discarding dependencies between uncertainties of different sounds within the respective acoustic coverage for the first speaker and for the second speaker (304). When viewing the full covariance as containing information regarding the uncertainty, discarding dependencies between uncertainties of different sounds uses a diagonal covariance in which non-diagonal terms corresponding to correlations between different dimensions are removed. The method also comprises representing the respective uncertainties of acoustic coverage in a manner that allows for efficient computation by representing an inverse of the respective uncertainties of acoustic coverage and then discarding the dependencies between the uncertainties of different sounds within the respective acoustic coverage for the first speaker and for the second speaker (306). The inverse of the respective uncertainties with discarded dependencies between the uncertainties refers to a precision matrix. The method also includes computing a score between the at least one speech utterance by the first speaker and the at least one speech utterance by the second speaker that leverages the respective uncertainties of the acoustic coverage during the comparison, the score being indicative of a likelihood that the first speaker and the second speaker are the same speaker (308). The method or corresponding apparatus can be used to perform speaker identification and can also be used to perform speaker verification.

It should be understood that the term "efficient" in the context of efficient memory usage and efficient computation can be any amount of efficiency that is an improvement over techniques that do not discard dependencies between uncertainties of different sounds for the speakers. Efficiency improvements can be in the form of percent, such as 5%, 10%, or 50% improvements, or can be in the form of memory size metrics (e.g., KBytes) for the efficient memory usage or number of calculations for the efficient computation. Table III below provides examples of efficiencies corresponding to the DFP-PLDA embodiments disclosed herein relative to FP-PLDA and PLDA systems of the prior art. Table II below provides additional examples of efficiencies in the form of algebraic expressions.

A particular embodiment of the foregoing method may also include representing the respective uncertainties of acoustic coverage in a manner that allows for efficient computation by accumulating a respective inverse of independent uncertainties of acoustic coverage for multiple speech utterances for the first speaker and multiple speech utterances for the second speaker. The accumulating results in cumulative diagonal precision matrices, where a diagonal matrix is implied by use of the term "independent." The particular embodiment also includes transforming a respective accumulated inverse of the independent uncertainties of acoustic coverage. The particular embodiment may also include discarding dependencies between the uncertainties of different sounds represented in the respective transformed accumulated inverse to produce a respective diagonalized, transformed accumulated inverse. The particular embodiment also includes computing the score by using the respective diagonalized, transformed accumulated inverses.

With respect to the foregoing, the covariance basically captures the uncertainty of coverage in the i-vector modeling due to insufficient acoustic coverage in the case of short utterances. The uncertainty is captured in the form of the variance for the different iVector dimensions where the larger the variance, the higher the uncertainty.

The precision matrix is related to the inverse of the covariance matrix. So say, for simplicity, that the i-vector elements are uncorrelated and the precision matrix's corresponding covariance matrix is diagonal with terms on the diagonal as sigma_1, sigma_2, . . . , sigma_M. The large sigmas from the covariance matrix (indicating high uncertainty) upon inversion have correspondingly small sigmas in the precision matrix, whereas the small sigmas in the covariance matrix have correspondingly high values (i.e., indicating certainty) in the form of a precision matrix.

In some sense, large diagonal values in the covariance matrix is an indication of which i-vector elements are the most uncertain, and large diagonal values in the precision matrix indicates which precision matrix elements are the most certain.

Figure 4:
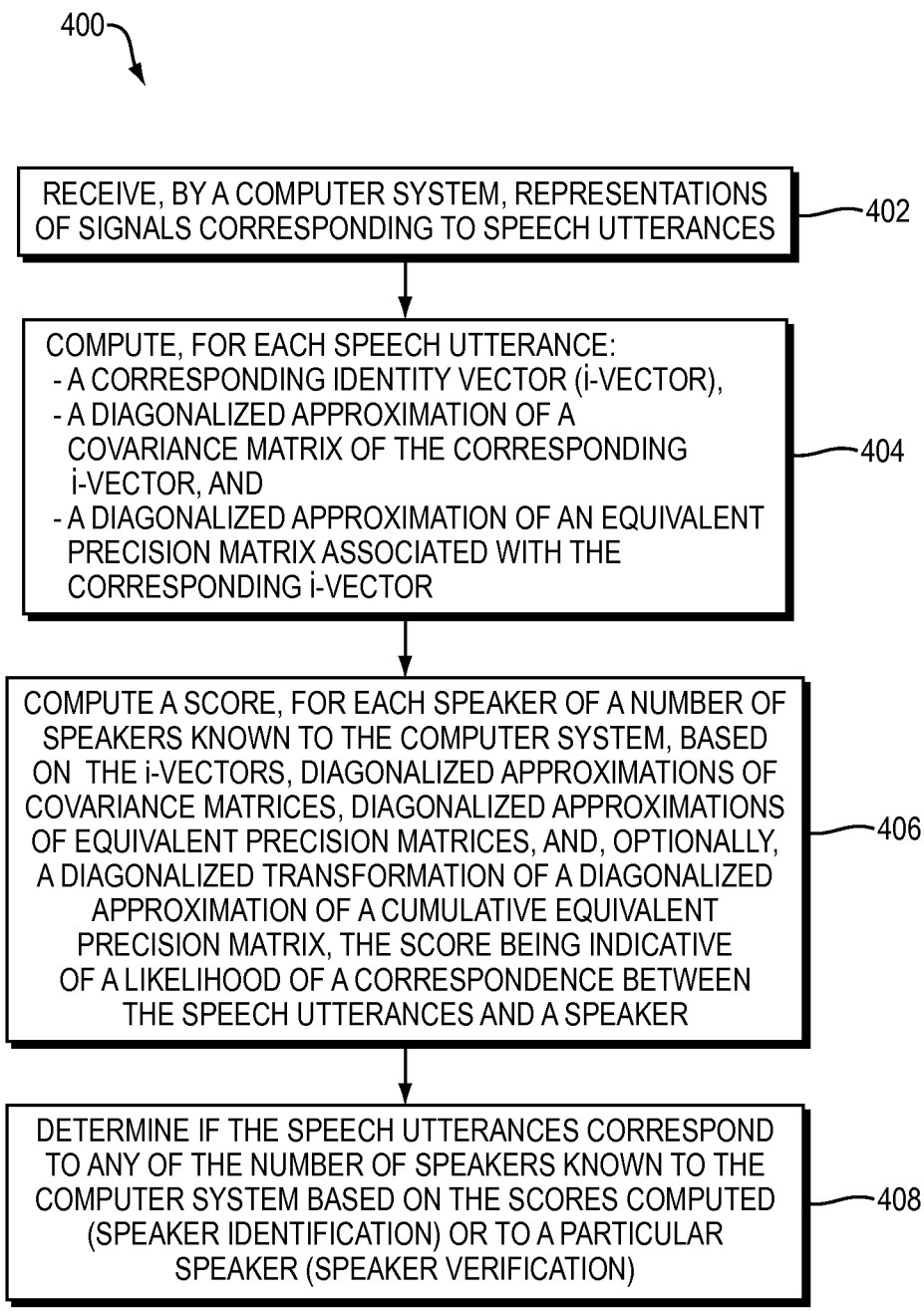
FIG. 4 is a flow diagram illustrating an example embodiment of the present invention executed by a processor.

FIG. 4 is a flow diagram 400 illustrating an example embodiment of a process employed by the present invention. First, the process receives a set of signals or representations of signals that correspond to speech utterances at a computer system (402). Then, the process computes, for each utterance: a corresponding identity vector (i-vector), a diagonalized approximation of a covariance matrix of the corresponding i-vector, and a diagonalized approximation of an equivalent precision matrix associated with the corresponding i-vector (404). Then, the process computes a score, for each speaker of a number of speakers known to the computer system, based on the i-vectors, the diagonalized approximations of covariance matrices, the diagonalized approximations of equivalent precision matrices, and, optionally, the diagonalized transformation of the diagonalized approximation of a cumulative equivalent precision matrix (406). In the case of verification, the process computes a score, for the speaker model parameters corresponding to the claimed ID and speech, to verify the speech is from the speaker corresponding to the claimed ID based on the i-vectors, the diagonalized approximations of covariance matrices, the diagonalized approximations of equivalent precision matrices, and the diagonalized transformation of the diagonalized approximation of the cumulative equivalent precision matrix (406). The score is indicative of a likelihood of a correspondence between the set of utterances received and the speaker (406). Then, the process, for identification, determines if the speech utterances correspond to any of the number of speakers known to the computer system based on the scores computed, and for verification, determines whether the speaker corresponding to the claimed ID matches the speech (408).

I-Vector Model

The i-vector extraction module 114 is configured to generate an i-vector based on the extracted feature coefficients. Given a sequence of feature vectors, referred to as $\chi = \{x_1, x_2, \ldots, x_\tau\}$, extracted from the speech signal 10 for an individual user, one i-vector is generated by the i-vector extraction module 114 based on an a-priori distribution of the i-vectors and the i-vector model described as $$s = u + Tw \quad (1)$$

where u is a Universal Background Model (UBM) super-vector representing statistical parameters, i.e., a plurality of mean vectors, associated with distributions of feature vectors extracted from training background audio data, s is a super-vector representing corresponding statistical parameters, i.e., a plurality of mean vectors, associated with distributions of feature vectors corresponding to the individual speaker, T is a low-rank rectangular matrix including vectors which span a subspace representing potential variations of the super-vector s with respect to the background statistical parameters in u, and w is an i-vector corresponding to the individual speaker characteristics in the spoken utterance.

According to at least one aspect, w is a realization of a latent variable W, of size M, having a standard normal prior distribution. Given T, and the set of feature vectors $\chi = \{x_1, x_2, \ldots, x_\tau\}$ extracted from the speech segment 10, it is possible to compute the likelihood of $\chi$ given the model (1), and a value for the latent variable W. The i-vector w, which represents the speech segment, is computed as the Maximum a Posteriori (MAP) point estimate of the variable W, i.e., the mean $\mu_\chi$ of the posterior distribution $P_{W|\chi}(w)$. Assuming a standard normal prior for W, the posterior probability of W given the acoustic feature vectors $\chi$ is Gaussian:

$$W|\chi \sim \mathcal{N}(\mu_\chi, \Gamma_\chi^{-1}) \quad (2)$$

with mean vector and precision matrix:

$$\mu_\chi = \Gamma_\chi^{-1} T^* \Sigma^{-1} f_\chi \quad (3a)$$

$$\Gamma_\chi = I + \sum_{c=1}^{C} N_\chi^{(c)} T^{(c)*} \Sigma^{(c)-1} T^{(c)}, \quad (3b)$$

respectively. In these equations, $N_\chi^{(c)}$ are the zero-order statistics estimated on the c-th Gaussian component of the UBM for the set of feature vectors $\chi$, $f_\chi$ is the super-vector stacking the first-order statistics $f_\chi^{(c)}$, centered around the corresponding UBM means:

$$f_\chi^{(c)} = \sum_t (\gamma_t^{(c)} x_t) - N_\chi^{(c)} u^{(c)} \quad (3c)$$

$\Sigma^{(c)}$ is the UBM c-th covariance matrix, $\Sigma$ is a block diagonal matrix having the matrices $\Sigma^{(c)}$ as its entries, $T^{(c)}$ is the sub-matrix of T corresponding to the c-th mixture component, and $\gamma_t^{(c)}$ is the c-th occupation probability of a feature vector $x_t$ of $\chi$.

Gaussian Full Posterior Distribution PLDA Model

An utterance z is represented in the standard Gaussian PLDA model by the i-vector posterior mean $\mu$, which is assumed to be the combination of three terms:

$$\mu = m + Uy + e, \quad (4)$$

where m is the i-vector mean, y is a speaker factor that has a normal prior distribution, matrix U typically constrains the speaker factor to be of lower dimension than the i-vectors, and the residual noise prior is Gaussian with full precision matrix $\Lambda$. That is:

$$Y \sim \mathcal{N}(0,I), \Sigma \sim \mathcal{N}(0,\Lambda^{-1}). \quad (5)$$

Considering the uncertainty associated with the extraction process of the i-vector, which is represented by its posterior covariance, the PLDA model in (5) is extended to exploit this additional information. This extended model, referred to as the PLDA based on the full posterior distribution of W given $\chi$, assumes that the feature vectors $x_t$ of an utterance $z_i$ are mapped to an i-vector $\mu$ according to the probability distribution $P_{w_i|\chi_i}(\mu)$. The extended model, or full-posterior PLDA (FP-PLDA) model, may be described as:

$$\mu = m + Uy + \bar{e}, \quad (6)$$

where the difference with equation (4) is that the distribution $\bar{E}$ of the residual noise $\bar{e}$ in equation (6) is utterance-dependent. The i-vector associated with the utterance $z_i$ is again the mean $\mu_i$ of the i-vector posterior $W_{i|\chi_i}$, but the priors of the PLDA parameters are given by:

$$\bar{E}_i \sim N(0, \Lambda^{-1} + \Gamma_i^{-1}) \sim N(0, \Lambda_{eq,i}^{-1}), Y \sim N(0, I), \tag{7}$$

where $\Gamma_i$ is the precision matrix produced by the i-vector extractor, and the equivalent precision matrix $\Lambda_{eq,i}$ is $$\Lambda_{eq,i} = (\Lambda^{-1} + \Gamma_i^{-1})^{-1}. \tag{8}$$

According to the FP-PLDA model, the likelihood that a set of n i-vectors $\mu_1 \ldots \mu_n$, or a corresponding set of utterances $z_1 \ldots z_n$, belongs to the same speaker may be computed as:

$$\log P(\mu_1 \ldots \mu_n | H_s) = \tag{9}$$
$$\sum_i \left[ \frac{1}{2} \log|\Lambda_{eq,i}| - \frac{M}{2} \log 2\pi - \frac{1}{2}(\mu_i - m)^T \Lambda_{eq,i}(\mu_i - m) \right] -$$
$$\frac{1}{2} \log|\Lambda_y| + \frac{1}{2} \mu_y^T \Lambda_y \mu_y - \frac{S}{2} \log 2\pi,$$

where M is the i-vector dimension, S is the speaker factor dimension, and the parameters $\Lambda_y, \mu_y$ are defined as:

$$\Lambda_y = I + \Sigma_i U^T \Lambda_{eq,i} U \tag{10a}$$

$$\mu_y = \Lambda_y^{-1} U^T \Sigma_i \Lambda_{eq,i}(\mu_i - m) \tag{10b}$$

The equations (10) are similar to their equivalents in the PLDA model except that in the PLDA model $\Lambda$ replaces $\Lambda_{eq,i}$, which accounts for the utterance-dependent i-vector precision matrix in the FP-PLDA model.

Complexity Analysis

Given a set of n enrollment utterances $u_{e_1} \ldots u_{e_n}$ for a target speaker, and a set of m test utterances of a single, unknown, speaker $u_{t_1} \ldots u_{t_m}$, the speaker verification log-likelihood ratio s is:

$$s = \log \frac{l(u_{e_1} \ldots u_{e_n}, u_{t_1} \ldots u_{t_m} | H_s)}{l(u_{e_1} \ldots u_{e_n} | H_s) l(u_{t_1} \ldots u_{t_m} | H_s)}, \tag{11}$$

where $H_s$ is the hypothesis that the two sets of utterances belong to the same speaker. The naive implementations of classical PLDA and of FP-PLDA have similar computational complexity. However, a common application scenario consists of a speaker detection task where a set of utterances of a single test speaker has to be verified against the utterances of a set of predefined target speakers. In this scenario, a smart implementation of PLDA allows some of the terms required for the evaluation of the speaker verification log-likelihood ratio to be pre-computed, thus the per-trial scoring complexity is greatly reduced. The FP-PLDA model does not allow the pre-computation of most of the terms of the scoring function, due to the presence of the utterance-dependent i-vector precision matrix in (9), thus its complexity may not be reduced.

TABLE I

Comparison of the log-likelihood computation complexity for three implementations of PLDA.

| System | Utterance-dependent per-set costs | Per-test costs | Per-trial costs |
|---|---|---|---|
| PLDA Naïve | NM | MS | $S^3$ |
| PLDA Optimized | NM | MS | S |
| FP-PLDA | $NM^3$ | $M^2S$ | $S^3$ |

A. Log-Likelihood Computation

The complexity of the log-likelihood computation accounts for three separate contributions:

per-target costs: operations that can be independently performed on target sets (referred to as per-target costs), per-test costs: operations that can be independently performed on test sets (referred to as per-test costs), per-trial costs: operations that jointly involve both the target and the test sets (referred to as per-trial costs), These distinctions are not relevant for naïve scoring implementations, but are relevant, instead, in the "predefined target speakers scenario" because the per-target terms can be pre-computed, and per-test terms need to be computed only once regardless of the number of target speakers.

Since the posteriors of the speaker variable y are computed on different sets, the parameters of the posterior distributions of y (10) to a generic set G are conditioned as:

$$\Lambda_{y|G} = I + \Sigma_{i \in G} U^T \Lambda_{eq,i} U \tag{12a}$$

$$\mu_{y|G} = \Lambda_y^{-1} U^T \Sigma_{i \in G} \Lambda_{eq,i}(\mu_i - m) \tag{12b}$$

The indexes of the sum in this equation, and in the following equations, are to be interpreted as running over all the utterances of the set. Replacing (9) in (11), the speaker verification log-likelihood ratio for a target set E and a test set T can be written as:

$$llr(E, T) = \log \frac{l(E, T | H_s)}{l(E | H_s) l(T | H_s)} \tag{13}$$
$$= \sigma(E, T) - \sigma(E) - \sigma(T) + \frac{S}{2} \log 2\pi$$

where the scoring function $\sigma$ is defined as:

$$\sigma(G) = -\frac{1}{2} \log|\Lambda_{y|(G)}| + \frac{1}{2} \mu_{y|(G)}^T \Lambda_{y|(G)} \mu_{y|(G)} \tag{14}$$

Analysis is restricted to the term $\sigma(E,T)$ because the computation of the log-likelihood ratio is dominated by the term $\sigma(E, T)$.

B. Complexity of the Standard Gaussian PLDA

As described above, standard PLDA corresponds to a FP-PLDA with $\Gamma_i^{-1} = 0$ for all i-vectors. Thus, $\Lambda_{eq,i} = \Lambda$ for all i-vectors, and the speaker variable posterior parameters become:

$$\Lambda_{y|(E,T)} = I + (n_E + n_T) U^T \Lambda U \tag{15a}$$

$$\mu_{y|(E,T)} = \Lambda_{y|(E,T)}^{-1} U^T \Lambda \left( \sum_{i \in E} (\mu_i - m) + \sum_{i \in E} (\mu_i - m) \right) \tag{15b}$$
$$= \Lambda_{y|(E,T)}^{-1} (F_E + F_T)$$

where $n_E$ and $n_T$ are the number of target and test segments, respectively, and $F_E$ and $F_T$ are the projected first order statistics defined as:

$$F_E = M \Sigma_{i \in E} (\mu_i - m),$$

$$F_T = M \Sigma_{i \in T} (\mu_i - m) \tag{16}$$

and $M = U^T \Lambda$ is a S×M matrix, where S is the PLDA speaker sub-space dimension. Using these definitions, the scoring function $\sigma(E, T)$ can be rewritten as:

$$\sigma(E,T) = -\frac{1}{2} \log|\Lambda_{y|(E,T)}| + F_E^T \Lambda_{y|(E,T)}^{-1} F_T + \frac{1}{2} F_T^T \Lambda_{y|(E,T)}^{-1} F_T + \frac{1}{2} F_E^T \Lambda_{y|(E,T)}^{-1} F_E \tag{17}$$

Computing the projected statistics (16) has complexity O(NM)+O(MS), where N is the number of utterances in the set. The $F_E$ and $F_T$ statistics are per-set computations because they are computed for the target and test sets independently. Their complexity is O(NM) because N i-vectors of dimension M are summed.

For the naïve scoring implementation, the computation of the score function σ(E, T) given the $F_G$ statistics, requires computing $\Lambda_{y|(E,T)}^{-1}$ and its log-determinant. These computations have complexity $O(S^3)$ because, for standard PLDA, the term $U^T\Lambda U$ can be pre-computed. Given $\Lambda_{y|(E,T)}^{-1}$, scoring σ(E, T) has complexity $O(S^2)$. The same considerations apply to the less expensive computation of σ(E) and σ(T). Thus, the overall per-trial complexity is $O(S^3)$.

For the speaker detection with known target sets, in the naïve implementation, the computation and inversion of $\Lambda_{y|(E,T)}$ dominates the scoring costs. However, in standard PLDA, this factor depends only on the number $(n_T+n_E)$ of the target and test utterances (15). Since each set of target utterances $E_k$ and the number of test utterances $n_T$ are known, it is possible to pre-compute the corresponding $\Lambda_{y|(E_k,T)}^{-1}$, and its log-determinant. Moreover, since the statistics $F_{E_k}$ are also known in advance, the terms of the scoring function $½F_{E_k}^T\Lambda_{y|(E_k,T)}^{-1}$ can be pre-computed. These terms are small S-sized vectors. Since the term depending only on the test statistics $F_T$ must be evaluated just once for the whole set of K targets, its computation has a per-test, rather than a per-trial, cost. Every function σ($E_k$, T) can be computed in O(S), and each term σ($E_k$) can be pre-computed. Given the statistics, the term σ(T) has a per-set complexity of $O(S^2)$. The overall per-set cost, including statistics computations, is then O(NM)+O(MS), whereas the per-trial cost is O(S).

C. Full-Posterior PLDA

The main difference between the standard PLDA and the FP-PLDA approach is that in PLDA $\Lambda_{y|(E,T)}$ depends only on the number of i-vectors in the set (15), whereas in FP-PLDA, it also depends on the covariance of each i-vector (12) in the test set T. This does not allow applying to FP-PLDA the optimizations illustrated in the previous section.

The speaker variable posterior parameters can still be written as:

$$\Lambda_{y|(E,T)} = I + (\Lambda_{eq,E} + \Lambda_{eq,T}) \quad (18a)$$

$$\mu_{y|(E,T)} = \Lambda_y^{-1}(F_{eq,E} + F_{eq,T}) \quad (18b)$$

where $$F_{eq,G} = U^T \Sigma_{i\in G} \Lambda_{eq,i}(\mu_i - m)$$

$$\Lambda_{eq,G} = U^T(\Sigma_{i\in G}\Lambda_{eq,i})U \quad (18c)$$

and the scoring function σ(E, T) is:

$$\sigma(E,T) = -½\log|\Lambda_{y|(E,T)}| + ½F_{eq,E}^T\Lambda_{(E,T)}^{-1}F_{eq,E} + ½F_{eq,T}^T\Lambda_{y|(E,T)}^{-1}F_{eq,T} + F_{eq,E}^T\Lambda_{y|(E,T)}^{-1}F_{eq,T} \quad (19)$$

Computing the posterior parameters (18) has a complexity $O(NM^3)+O(M^2S)$, mainly due to the computation of $\Lambda_{eq,i}$ and is much higher than the O(NM)+O(MS) complexity of standard PLDA approach. However, these computations are required only for a new target or test speaker. These per-set costs are comparable to the costs $O(NM^3)$ of the i-vector extraction. Given the statistics, $\Lambda_{y|(E,T)}$ can be computed with complexity $O(S^2)$ and its inversion complexity is $O(S^3)$. The computation of the remaining terms requires $O(S^2)$; thus, the overall per-trial complexity is $O(S^3)$. Since the posterior parameter $\Lambda_{y|(E,T)}$ cannot be pre-computed as in standard PLDA, the per-trial complexity is the same also for the fixed set of target speaker scenarios. Table I compares the log-likelihood computation complexity of the naïve and optimized PLDA implementations, with respect to the complexity of FP-PLDA. The computational requirements of the FP-PLDA system are much more expensive than standard PLDA due to the computation of $\Lambda_{y|(E,T)}$ that increase both the per-set and the per-test costs. Table I, above also shows that the per-trial costs of FP-PLDA is two orders of magnitude larger than the optimized implementation of PLDA.

Approximated Full-Posterior PLDA

The proposed FP-PLDA model allows improving speaker recognition performance. However, as shown before, its per-trial score complexity greatly increases compared to the standard PLDA approach. Moreover, additional memory is required not only to store the covariance of the i-vector, but also to store some pre-computed matrices for computational efficiency. Embodiments of the present invention address these issues by applying a sequence of diagonalization operators that approximates the full matrices needed for i-vector scoring. Three approximations for fast scoring can be created with a very small impact on the FP-PLDA system accuracy.

A. Diagonalized i-Vector Posterior

The first, straightforward, approximation includes approximating the i-vector posterior covariance by a diagonal matrix:

$$\Gamma_i^{-1} \leftarrow \Gamma_i^{-1} \circ I \quad (20)$$

where ○ is the element-wise product operator. Using a diagonal i-vector posterior covariance allows significant memory savings for storing the target models (O(M) rather than $M^2$). However, even though the i-vector posterior covariance is diagonal, the matrices $\Lambda_{eq,i}$ of (8) remain full. Thus, this approach alone does not give any computational advantage with respect to the standard FP-PLDA. Moreover, this approximation is related to the i-vector extractor rather than to the PLDA classification model.

B. Diagonalized Residual Covariance

In order to speed-up the computation of the covariance of the residual term $\overline{E}_i$ (7), it is diagonalized, which not only reduces the scoring complexity, but also allows the exact PLDA solution to be recovered for long enough utterances. In particular, the precision matrix Λ of the PLDA residual term E can be eigen-decomposed as:

$$\Lambda = V_\Lambda D_\Lambda V_\Lambda^T$$

where $V_\Lambda$ is an orthogonal matrix, and $D_\Lambda$ is a diagonal matrix. The precision matrix of $\overline{E}_i$ thus can written as:

$$\Lambda_{eq,i} = (\Lambda^{-1}+\Gamma_i^{-1})^{-1} = (V_\Lambda D_\Lambda^{-1} V_\Lambda^T + \Gamma_i^{-1})^{-1} = V_\Lambda(D_\Lambda^{-1} + V_\Lambda^T \Gamma_i^{-1} V_\Lambda)^{-1} V_\Lambda^T \quad (21)$$

The proposed approximation consists in replacing the term $V_\Lambda^T \Gamma_i^{-1} V_\Lambda$ by a diagonal matrix $V_\Lambda^T \Gamma_i^{-1} V_\Lambda \circ I$.

In order to analyze the complexity of the scoring with this approximation, $\Lambda_{eq,i}^D$ is defined as:

$$\Lambda_{eq,i}^D = (D_\Lambda^{-1} + V_\Lambda^T \Gamma_i^{-1} V_\Lambda \circ I)^{-1} \quad (22)$$

and the approximated $\Lambda_{eq,i}$ (21) is rewritten as:

$$\Lambda_{eq,i} = V_\Lambda \Lambda_{eq,i}^D V_\Lambda^T \quad (23)$$

The statistics $F_{eq,E}$ and $F_{eq,T}$ can be computed by replacing (23) in (18). The approximated speaker identity posterior covariance can be rewritten as:

$$\Lambda_{y|(E,T)} = I + U^T V_\Lambda (\Lambda_{eq,E}^D + \Lambda_{eq,T}^D) V_\Lambda^T U \quad (24)$$

where $$\Lambda_{eq,E}^D = \Sigma_{i\in E}\Lambda_{eq,i}^D, \Lambda_{eq,T}^D = \Sigma_{i\in T}\Lambda_{eq,i}^D \quad (25)$$

Thus, $\Lambda_{y|(E,T)}$ depends on the i-vectors covariance only through the diagonal statistics $\Lambda_{eq,E}^D$ and $\Lambda_{eq,T}^D$

TABLE II

Comparison of the complexity of approximated Full-Posterior-PLDA diagonalization approaches.

| $Q_\Gamma$ | $Q_\Lambda$ | QY | I-Vector Extraction | Utterance-dependent per-set costs | Per-test Costs | Per-trial Costs |
|---|---|---|---|---|---|---|
| 1 | 1 | 1 | $NM^3$ | $NM^3$ | $M^2S$ | $S^3$ |
| I | 1 | 1 | $NM^2$ | $NM^3$ | $M^2S$ | $S^3$ |
| 1 | I | 1 | $NM^3$ | $NM^3$ | $MS^2$ | $S^3$ |
| I | I | 1 | $NM^2$ | $NM^2$ | $MS^2$ | $S^3$ |
| 1 | 1 | I | $NM^3$ | $NM^3$ | $M^2S$ | $S$ |
| I | I | I | $NM^2$ | $NM^2$ | $MS$ | $S$ |

C. Diagonalized Speaker Identity Posterior

A third approximation, which further decreases the scoring complexity, includes a joint approximated diagonalization of the speaker identity posteriors. Such joint diagonalization does not introduce approximations in standard PLDA. The term $U^T \Lambda U$ in (15) is decomposed as:

$$U^T \Lambda U = V_Y D_Y V_Y^T \quad (26)$$

where $V_Y$ is an orthogonal matrix and $D_Y$ is diagonal. The speaker identity posterior covariance is then given by:

$$\Lambda_{y|(E,T)}^{-1} = (I+(n_E+n_T)V_Y D_Y V_Y^T)^{-1} = V_Y (I+(n_E+n_T) D_Y)^{-1} V_Y^T \quad (27)$$

where the factor $I+(n_E+n_T)D_Y$ is diagonal.

The same decomposition of $U^T \Lambda U$ can be applied to FP-PLDA obtaining:

$$\Lambda_{y|(E,T)}^{-1} = (I+V_Y(\hat{D}_{eq,E}+\hat{D}_{eq,T})V_Y^T)^{-1} = V_Y(I+(\hat{D}_{eq,E}+\hat{D}_{eq,T}))^{-1}V_Y^T \quad (28)$$

where $$\hat{D}_{eq,E} = V_Y^T U^T \Lambda_{eq,E} U V_Y \quad (29a)$$

$$\hat{D}_{eq,T} = V_Y^T U^T \Lambda_{eq,T} U V_Y \quad (29b)$$

In contrast with standard PLDA, the matrices $\hat{D}_{eq,E}$ and $\hat{D}_{eq,T}$ are not diagonal. The proposed diagonalization includes replacing these terms by the diagonal matrices:

$$D_{eq,E} = \hat{D}_{eq,E} \circ I, D_{eq,T} = \hat{D}_{eq,T} \circ I \quad (30)$$

The impact of this approximation becomes irrelevant with the increase of the utterance duration, as it happens with the diagonalized residual covariance approach.

D. Diagonalized FP-PLDA

The three diagonalization approaches, illustrated in the previous sub-sections, can be efficiently combined to speed-up the computation of the FP-PLDA log-likelihood ratios. Embodiments of present invention provide a sequence of operations for computing the scoring function $\sigma(E, T)$ of a fully diagonalized FP-PLDA. Table II compares the complexity of the different approaches.

In every presented approximation, replacing the diagonalizing operator $\circ$ I by the operator $\circ$ 1, where 1 is a matrix of ones, produces the standard FP-PLDA solution. For each diagonalization approach, a matrix operator Q is defined such that Q=I when the diagonalization is applied, and Q=1 otherwise. $Q_\Gamma$, $Q_\Lambda$, $Q_Y$ are defined as the operators associated to i-vector covariance diagonalization, residual covariance diagonalization, and speaker identity posterior covariance diagonalization, respectively. For each utterance, the i-vector covariance matrix approximation is defined as:

$$(\Gamma_i^D)^{-1} = \Gamma_i^{-1} \circ Q_\Gamma \text{ or } (\Gamma_i^D)^{-1} = (\Gamma_i \circ Q_\Gamma)^{-1} \quad (31)$$

An S×M matrix W is also defined as:

$$W = V_Y^T U^T V_\Lambda \quad (32)$$

The operations for computing the scoring function $\sigma(E, T)$ are:

1) For each utterance compute:

$$\Gamma_{\Lambda,i}^{-1} = V_\Lambda^T (\Gamma_i^D)^{-1} V_\Lambda \circ Q_\Lambda \quad (33)$$

and the approximated equivalent precision matrix:

$$\Lambda_{eq,i}^D = (D_\Lambda^{-1} + \Gamma_{\Lambda,i}^{-1})^{-1} \quad (34)$$

2) For each set G compute:

$$F_{eq,G} = W \Sigma_{i \in G} \Lambda_{eq,i}^D V_\Lambda^T (\mu_i - m) \quad (35)$$

and the diagonalized approximation of a cumulative equivalent precision matrix:

$$\Lambda_{eq,G}^D = \Sigma_{i \in G} \Lambda_{eq,i}^D \quad (36)$$

and its diagonalized transformation:

$$D_{eq,G} = W \Lambda_{eq,G}^D W^T \circ Q_Y \quad (37)$$

3) For each trial, compute:

$$(\Lambda_{y|(E,T)}^D)^{-1} = (I + D_{eq,E} + D_{eq,T})^{-1} \quad (38)$$

$$\sigma(E,T) = -\tfrac{1}{2} \log|(\Lambda_{y|(E,T)}^D)^{-1}| + \tfrac{1}{2} F_{eq,E}^T (\Lambda_{y|(E,T)}^D)^{-1} F_{eq,E} + \tfrac{1}{2} F_{eq,T}^T (\Lambda_{y|(E,T)}^D)^{-1} F_{eq,T} + F_{eq,E}^T (\Lambda_{y|(E,T)}^D)^{-1} F_{eq,T} \quad (39)$$

Equation (31) can be considered part of the i-vector extractor. Equation (31) also directly impacts the complexity of the extractor. In fact, if $Q_\Gamma$=1 the full covariance of the i-vector has to be computed with complexity $O(NM^3)$. On the other hand, if $Q_\Gamma$=I, only the diagonal of the i-vector posterior is needed.

Table II summarizes the complexity of the approaches for different settings of the diagonalizing operators $Q_\Gamma$, $Q_\Lambda$, $Q_Y$. Combining different approximations notably reduces the complexity with respect to the individual contribution of each diagonalization. Applying the sequence of the proposed approaches reduces both the per-set and per-trial scoring computations, thus shrinking the computational gap between standard PLDA and FP-PLDA.

TABLE III

Comparison of the performance and complexity of PLDA, FP-PLDA, and diagonalized FP-PLDA on a liveness detection task.

| System | % EER | DCF08 | Model size (KB) | Scoring time | Total time |
|---|---|---|---|---|---|
| PLDA | 8.12 | 0.415 | 3.5 | 7.5 | 581 |
| FP-PLDA | 4.64 | 0.228 | 81 | 165.9 | 2037 |
| DFP-PLDA | 5.29 | 0.261 | 5.1 | 7.9 | 881 |

Table III provides an example of the results obtained on a liveness detection task, in terms of percent Equal Error Rate, minimum Decision Cost Function (DCF08), model size (in KB), scoring time, and total time (i-vector extraction+scoring) in seconds. In these experiments, every utterance was processed after Voice Activity Detection, extracting every 10 ms, 19 Mel frequency cepstral coefficients, and the frame log-energy on a 25 ms sliding Hamming window. This 20-dimensional feature vector was subjected to short time mean and variance normalization using a 3 second (s) sliding window, and a 45-dimensional feature vector was obtained by stacking 18 cepstral ($c_1$-$c_{18}$), 19 delta ($\Delta c_0$-$\Delta c_{18}$) and 8 double-delta ($\Delta\Delta c_0$-$\Delta\Delta c_7$) parameters.

A gender-independent i-vector extractor was trained. The training was based on a 1024-component diagonal covariance gender-independent UBM, and on a gender-independent T matrix, trained using NIST SRE 2004-2010 and additionally the Switchboard II, Phases 2 and 3, and Switchboard Cellular, Parts 1 and 2 datasets for a total of 66140 utterances. The i-vector dimension was fixed to d=400.

PLDA models were trained with full-rank channel factors, using 200 dimensions for the speaker factors, using the NIST SRE 2004-2010 datasets, for a total of 48568 utterances of 3271 speakers.

The i-vectors of the PLDA models were whitened and normalized according to the Projected Length Normalization:

$$\overline{W} \sim N\left(\frac{\mu_\chi}{\|\mu_\chi\|}, \frac{\Gamma_\chi^{-1}}{\|\mu_\chi\|^2}\right) \quad (40)$$

The results in the first and second rows of Table III clearly show how valuable is the "uncertainty" information exploited by the FP-PLDA approach. FP-PLDA is able to reduce the percent EER and the cost function by more than 40%, but it introduces a huge increase of memory and computational costs. The diagonalized FP-PLDA approach dramatically reduces these costs, still improving the PLDA performance by approximately 35%.

The Diagonalized FP-PLDA model exploits the uncertainty of the i-vector extraction process. By applying an appropriate sequence of diagonalization operators that approximate the full matrices needed for i-vector scoring, a computational complexity in scoring is obtained that is comparable to PLDA, but with a performance that remains comparable to the more accurate FP-PLDA models. Other advantages of this approach are the reduced memory costs with respect to FP-PLDA, and the possibility of applying the same technique in combination with the Factorized Subspace Estimation approach.

Detailed Complexity Analysis

A. Standard FP-PLDA

Most of the operations detailed in the method are redundant for standard FP-PLDA. However, the resulting asymptotic complexity for FP-PLDA is the same, and the operations serve as a reference for describing the contribution of the different approximations on the overall scoring complexity.

Equation (33) has a complexity $O(NM^3)$.

Since $\Gamma_{A,i}^{-1}$ is a full matrix, Equation (34) has a complexity $O(NM^3)$, and produces a full $\Lambda_{eq,i}^D$ matrix.

The computation of the statistics in (35) and (36) have an overall complexity $O(NM^2)+O(MS)$, and $\Lambda_{eq,G}^D$ is again a full matrix.

The computation of $D_{eq,G}$ in (37) has a complexity of $O(M^2S)$ and, again, results in a non-diagonal matrix.

The per-trial term in equation (38) has a complexity $O(S^3)$.

Finally, equation (39) can be computed in $O(S^2)$.

Combining all these operations gives an overall $O(NM^3)+O(M^2S)$ per-set complexity, and $O(S^3)$ per-trial complexity.

B. Diagonalized I-Vector Covariance

Diagonalization of the i-vector posterior covariance corresponds to setting $Q_\Gamma=I$.

Although $(\Gamma_i^D)^{-1}$ is diagonal, equation (33) still requires $O(NM^3)$ operations.

Since $\Gamma_{A,i}^{-1}$ is full, all the remaining operations have the same complexity of the standard FP-PLDA.

The overall complexity is, therefore, the one given in the previous sub-section.

C. Diagonalized Residual Covariance

The complexity of the diagonalized residual covariance approximation is related to the use of the diagonalized i-vector covariance approximation.

In particular:

Equation (33) has complexity $O(NM^3)$. However, if $(\Gamma_i^D)^{-1}$ is diagonal, $\Gamma_{A,i}^{-1}$ can be evaluated in $O(NM^2)$ operations because only the diagonal of the right hand side of the equation is needed.

Since $\Gamma_{A,i}^{-1}$ is diagonal, Equation (34) has a complexity $O(NM)$.

The computations of the statistics in Equation (35) requires $O(NM^2)+O(MS)$ operations.

The terms in Equation (36) can be computed in $O(NM)$ operations.

Equation (37) has a per-set complexity $O(MS^2)$.

Equation (38) has a per-trial complexity $O(S^3)$.

Finally, Equation (39) can be computed in $O(S^2)$.

Overall, the per-set complexity is $O(NM^3)+O(MS^2)$ and the per-trial complexity is $O(S^3)$. However, if this approximation is preceded with the diagonalization of the i-vector posterior covariance, the per-set complexity decreases to $O(NM^2)+(MS^2)$.

D. Diagonalized Speaker Identity Posterior

Again, the complexity of this approximation depends on the sequential application of the first two diagonalization. In particular:

The complexity of equations (33) to (36) depends only on the previous approximations, and is not affected by the diagonalization of the speaker posterior covariance.

Equation (37) has complexity $O(M^2S)$. However, it can be computed in $O(MS)$ if $\Lambda_{eq,G}^D$ is diagonal, because only the diagonal of the right hand side of the equation is needed.

Since $D_{eq,G}$ is diagonal equation, Equation (38) has a per-trial complexity $O(S)$.

Finally, Equation (39) can be computed in $O(S^2)$.

This approximation allows the per-trial complexity to be reduced from $O(S^3)$ of standard FP-PLDA to $O(S^2)$. The per-set complexity is also heavily dependent on the use of the previous approximations.

Embodiments or aspects of the present invention may be implemented in the form of hardware, software, or firmware. If implemented in software, the software may be any form of software capable of performing operations consistent with the example embodiments disclosed herein. The software may be stored in any non-transitory computer readable medium, such as RAM, ROM, magnetic disk, or optical disk. When loaded and executed by processor(s), the processor(s) are configured to perform operations consistent with the example embodiments disclosed herein. The processor(s) may be any form of processor(s) capable of being configured to execute operations as disclosed herein. It should be understood that the terms processor and computer system or the like may be used interchangeably herein.

While this invention has been particularly shown and described with references to example embodiments thereof, it will be understood by those skilled in the art that various changes in form and details may be made therein without departing from the scope of the invention encompassed by the appended claims.

What is claimed is:

1. A method of speaker recognition in a speaker recognition system, the method comprising:
    by a processor, estimating respective uncertainties of acoustic coverage of at least one speech utterance by a first speaker and at least one speech utterance by a second speaker, the acoustic coverage representing respective sounds used by the first speaker and by the second speaker when speaking;
    by the processor, representing the respective uncertainties of acoustic coverage in a manner that allows for efficient memory usage by discarding dependencies between uncertainties of different sounds for the first speaker and for the second speaker to improve speaker recognition performance of the processor;

by the processor, representing the respective uncertainties of acoustic coverage in a manner that allows for efficient computation by representing an inverse of the respective uncertainties of acoustic coverage and then discarding the dependencies between the uncertainties of different sounds for the first speaker and for the second speaker to further improve the speaker recognition performance of the processor; and by the processor, computing a score between the at least one speech utterance by the first speaker and the at least one speech utterance by the second speaker in a manner that leverages the respective uncertainties of the acoustic coverage during the comparison, the score being indicative of a likelihood that the first speaker and the second speaker are the same speaker.

2. A method of claim 1 wherein:

representing the respective uncertainties of acoustic coverage in a manner that allows for efficient computation includes:

accumulating an inverse of independent uncertainties of acoustic coverage for multiple speech utterances by the first speaker and for multiple speech utterances by the second speaker;

transforming accumulated inverses of the independent uncertainties of acoustic coverage; and discarding dependencies between the uncertainties of different sounds represented in the transformed accumulated inverses to produce respective diagonalized, transformed accumulated inverses; and computing the score includes using the respective diagonalized, transformed accumulated inverses.

3. The method of claim 1 further comprising receiving, by a computer system, a set of signals corresponding to the speech utterances; and wherein representing the respective uncertainties of acoustic coverage in memory and computationally efficient manners include:

computing, for each speech utterance of the set of speech utterances, a corresponding identity vector (i-vector), a diagonalized approximation of a covariance matrix of the corresponding i-vector, and a diagonalized approximation of an equivalent precision matrix associated with the corresponding i-vector; and further wherein:

computing the score is based on the i-vectors, the diagonalized approximations of covariance matrices, and the diagonalized approximations of equivalent precision matrices computed, the score being indicative of a likelihood of a correspondence between the set of utterances received and a speaker.

4. The method of claim 3, wherein computing the score includes computing the score for each speaker of a number of speakers known to the computer system, and the method further comprises:

determining an identifier corresponding to the speaker having the highest score.

5. The method of claim 3 further comprising:

computing a set of projected first order statistics corresponding to the set of speech utterances, based on the i-vectors and the diagonalized approximations of the equivalent precision matrices computed;

computing a diagonalized approximation of a cumulative equivalent precision matrix for the set of speech utterances based on the diagonalized approximations of precision matrices computed for each i-vector; and diagonalizing a transformation of the diagonalized approximation of the cumulative equivalent precision matrix computed; and wherein, computing the score includes computing the score based on the set of projected first order statistics, the diagonalized approximation of the cumulative equivalent precision matrix, and the diagonalized transformation of the diagonalized approximation of the cumulative equivalent precision matrix.

6. The method of claim 5 further comprising:

computing, for each i-vector of a set of i-vectors corresponding to a speaker known to the computer system by way of parameters that had been previously stored in an associated database, the diagonalized approximation of a covariance matrix of the i-vector corresponding to the speaker known to the computer system and a diagonalized approximation of an equivalent precision matrix associated with the i-vector corresponding to the speaker known to the computer system; and storing the i-vector and the diagonalized approximation of a covariance matrix of the i-vector in a database.

7. The method of claim 6 further comprising:

computing a set of projected first order statistics, for each speaker known to the computer system, based on the set of i-vectors associated with the speaker known to the computer system and the diagonalized approximations of the equivalent precision matrices computed;

computing a diagonalized approximation of a cumulative equivalent precision matrix for each speaker known to the computer system based on the diagonalized approximations of precision matrices computed for each i-vector in the set of i-vectors corresponding to the speaker known to the computer system; and diagonalizing a transformation of the diagonalized approximation of the cumulative equivalent precision matrix computed for each speaker known to computer system.

8. The method of claim 7, wherein computing the score includes computing the score based on the set of projected first order statistics, the diagonalized approximation of the cumulative equivalent precision matrix, and the diagonalized transformation of the diagonalized approximation of the cumulative equivalent precision matrix associated with the speaker known to the computer system.

9. The method of claim 3, wherein determining if the set of speech utterances corresponds to one or any of the number of speakers known to the computer system includes comparing the score computed to a threshold.

10. An apparatus for speaker recognition, the apparatus comprising:

an estimation module configured to estimate respective uncertainties of acoustic coverage of at least one speech utterance by a first speaker and at least one speech utterance by a second speaker, the acoustic coverage representing respective sounds used by the first speaker and by the second speaker when speaking;

a processor; and a memory, with computer code instructions stored thereon, wherein the processor and the memory, with the computer code instructions stored thereon, are configured to cause the apparatus to:

represent the respective uncertainties of acoustic coverage in a manner that allows for efficient memory usage by discarding dependencies between uncertainties of different sounds for the first speaker and for the second speaker to improve speaker recognition performance of the processor; and represent the respective uncertainties of acoustic coverage in a manner that allows for efficient computation by representing an inverse of the respective uncertainties of acoustic coverage and then discarding the dependencies between the uncertainties of different sounds for the first speaker and for the second speaker to further improve the speaker recognition performance of the processor; and a scoring module configured to compute a score between the at least one speech utterance by the first speaker and the at least one speech utterance by the second speaker in a manner that leverages the respective uncertainties of the acoustic coverage during the comparison, the score being indicative of a likelihood that the first speaker and the second speaker are the same speaker.

11. The apparatus of claim 10 wherein the processor, in representing the respective uncertainties of acoustic coverage in a manner that allows for efficient computation, is further configured to:

accumulate an inverse of independent uncertainties of acoustic coverage for multiple speech utterances by the first speaker and for multiple speech utterances by the second speaker;

transform accumulated inverses of the independent uncertainties of acoustic coverage; and discard dependencies between the uncertainties of different sounds represented in the transformed accumulated inverses to produce respective diagonalized, transformed accumulated inverses; and wherein the scoring module is further configured to compute the score using the respective diagonalized, transformed accumulated inverses.

12. The apparatus of claim 10, wherein the processor and the memory, with the computer code instructions stored thereon, are configured to cause the apparatus to:

receive a set of signals corresponding to a set of speech utterances;

compute, for each speech utterance of the set of speech utterances, the representations of the respective uncertainties of acoustic coverage in the memory and computationally efficient manners by computing a corresponding identity vector (i-vector), a diagonalized approximation of a covariance matrix of the corresponding i-vector, and a diagonalized approximation of an equivalent precision matrix associated with the corresponding i-vector; and compute the score based on the i-vectors, the diagonalized approximations of covariance matrices, and the diagonalized approximations of equivalent precision matrices computed, the score being indicative of a likelihood of a correspondence between the set of utterances received and a speaker.

13. The apparatus of claim 12 further comprising determining if the set of speech utterances corresponds to any of the number of speakers known to the processor based on the scores computed.

14. The apparatus of claim 13, wherein computing the score includes computing the score for each speaker of a number of speakers known to the processor, and the instructions are further configured to cause the apparatus to:

determine an identifier corresponding to the speaker having the highest score.

15. The apparatus of claim 12, wherein the processor and the memory, with the computer code instructions stored thereon, being further configured to cause the apparatus to:

compute a set of projected first order statistics corresponding to the set of speech utterances based on the i-vectors and the diagonalized approximations of the equivalent precision matrices computed;

compute a diagonalized approximation of a cumulative equivalent precision matrix for the set of speech utterances based on the diagonalized approximations of precision matrices computed for each i-vector; and diagonalize a transformation of the diagonalized approximation of the cumulative equivalent precision matrix computed; and wherein, in computing the score, the processor and the memory, with the computer code instructions stored thereon, are further configured to cause the apparatus to compute the score based on the set of projected first order statistics, the diagonalized approximation of the cumulative equivalent precision matrix, and the diagonalized transformation of the diagonalized approximation of the cumulative equivalent precision matrix.

16. The apparatus of claim 12, wherein the processor and the memory, with the computer code instructions stored thereon, are further configured to cause the apparatus to:

compute, for each i-vector of a set of i-vectors corresponding to a speaker known to the computer system by way of parameters that were previously stored in an associated database, a diagonalized approximation of a covariance matrix of the i-vector corresponding to the speaker known to the computer system and a diagonalized approximation of an equivalent precision matrix associated with the i-vector corresponding to the speaker known to the processor; and store the diagonalized approximation of a covariance matrix of the i-vector in the database.

17. The apparatus of claim 12, wherein the processor and the memory, with the computer code instructions stored thereon, are further configured to cause the apparatus to:

compute a set of projected first order statistics, for each speaker known to the computer system, based on the set of i-vectors associated with the speaker known to the computer system and the diagonalized approximations of the equivalent precision matrices computed;

compute a diagonalized approximation of a cumulative equivalent precision matrix for each speaker known to the computer system based on the diagonalized approximations of precision matrices computed for each i-vector in the set of i-vectors corresponding to the speaker known to the processor; and diagonalize a transformation of the diagonalized approximation of the cumulative equivalent precision matrix computed for each speaker known to computer system.

18. The apparatus of claim 17, wherein in computing the score, the processor and the memory, with the computer code instructions stored thereon, are further configured to cause the apparatus to compute the score based on the set of projected first order statistics, the diagonalized approximation of the cumulative equivalent precision matrix, and the diagonalized transformation of the diagonalized approximation of the cumulative equivalent precision matrix associated with the speaker known to the processor.

19. The apparatus of claim 12, wherein in determining if the set of speech utterances corresponds to one or any of the number of speakers known to the processor, the processor and the memory, with the computer code instructions stored thereon, are further configured to cause the apparatus to compare the score computed to a threshold.

20. A non-transitory computer-readable medium having computer instructions stored thereon, the instructions, when loaded and executed by a processor, cause an apparatus to perform speaker recognition by:
- estimating, by a processor, respective uncertainties of acoustic coverage of at least one speech utterance by a first speaker and at least one speech utterance by a second speaker, the acoustic coverage representing respective sounds used by the first speaker and by the second speaker when speaking;
- representing, by the processor, the respective uncertainties of acoustic coverage in a manner that allows for efficient memory usage by discarding dependencies between uncertainties of different sounds for the first speaker and for the second speaker to improve speaker recognition performance of the processor;
- representing, by the processor, the respective uncertainties of acoustic coverage in a manner that allows for efficient computation by representing an inverse of the respective uncertainties of acoustic coverage and then discarding the dependencies between the uncertainties of different sounds for the first speaker and for the second speaker to further improve the speaker recognition performance of the processor; and
- computing, by the processor, a score between the at least one speech utterance by the first speaker and the at least one speech utterance by the second speaker in a manner that leverages the respective uncertainties of the acoustic coverage during the comparison, the score being indicative of a likelihood that the first speaker and the second speaker are the same speaker.

* * * * *